United States Patent [19]

Hoeschele, Jr. et al.

[11] 3,882,458

[45] May 6, 1975

[54] VOICE OPERATED SWITCH INCLUDING APPARATUS FOR ESTABLISHING A VARIABLE THRESHOLD NOISE LEVEL

[75] Inventors: David F. Hoeschele, Jr., Norristown; Eugene H. Barnes, Philadelphia, both of Pa.

[73] Assignee: General Electric Company, Fairfield, Conn.

[22] Filed: Mar. 27, 1974

[21] Appl. No.: 455,264

[52] U.S. Cl...... 340/146.1 R; 179/1 VC; 179/15 AS

[51] Int. Cl........... H04b 15/00

[58] Field of Search............ 340/146.1 R, 148, 169; 179/1 P, 1 SA, 1 VC, 15.55 T, 15 AS; 325/65

[56] References Cited

UNITED STATES PATENTS

| | | | |
|---|---|---|---|
| 3,471,648 | 10/1969 | Miller | 179/1 SA |
| 3,555,192 | 1/1971 | Hymer | 179/1 VC |
| 3,649,766 | 3/1972 | LaMarche | 179/15 AS |
| 3,712,959 | 1/1973 | Fariello | 179/1 VC |
| 3,832,491 | 8/1974 | Sciulli et al. | 179/1 VC |

*Primary Examiner*—Charles E. Atkinson
*Attorney, Agent, or Firm*—Allen E. Amgott; Raymond H. Quist; Henry W. Kaufmann

[57] ABSTRACT

A digital voice-operated switch including a sampling circuit for establishing a threshold noise level as a function of background plus electrical noise in a communications system. The switch operation is synchronized with the system clock and utilizes high speed circuitry to enable at a syllabic rate. To prevent loss of digitalized information and to prevent transients when a transmitter is activated the switch includes circuitry for delaying information and for producing a recognition code to be transmitted prior to transmission of each block of syllabic information. For operation in a receiver the switch includes circuitry for detecting the recognition code and enabling a logic gate to allow passage of information following the code. The receiver portion of the switch also includes logic circuitry for providing a sequence of logic signals to a digital to analog decoder when information is not being received so as to minimize error accumulation in the decoder.

28 Claims, 6 Drawing Figures

VOICE OPERATED SWITCH INCLUDING APPARATUS FOR ESTABLISHING A VARIABLE THRESHOLD NOISE LEVEL

BACKGROUND OF THE INVENTION:

1. Field of the Invention.

This invention relates to a method and apparatus for an all digital voice operated switch in combination with a variable threshold noise level.

2. Description of the Prior Art.

In most conversations a relatively large percentage of time is taken up by pauses or tones too faint to be intelligible and consequently not important to an understanding of the conversation. Communications engineers have utilized this fact to reduce power consumption in a transmitter by turning off the transmitter during such pauses or faint tones or, in other words, energizing the transmitter only when meaningful signals are present.

The primary problem faced by engineers in the design of a voice operated switch is the establishment of a threshold level to differentiate between noise and actual voice signals. In many instances problems arise because the noise level tends to fluctuate thus preventing a trigger level based on a fixed signal amplitude level. In prior art analog systems the root-mean-square (rms) rather than instantaneous signal amplitude level is generally utilized. Although this procedure normally prevents triggering on noise transients, it does suffer from the disadvantage of requiring a relatively long delay from the initiation of the speech signal until sufficient rms value can build up to the trigger level. This delay results in clipping of the initial portion of a speech signal giving the output signal an undesirable sharp clipped quality and results in considerable distortion. In addition, the long delay in building up the rms value generally prevents an analog system from operating on a syllabic basis and consequently much unnecessary information is transmitted.

Attempts have been made to overcome the problems associated with analog systems in recently developed digital transmission systems. In digital systems, particularly in those with high sampling rates, the instantaneous value of the input signal is often used to trigger a voice operated switch. As with an analog system such triggering may cause the transmitter to be activated in response to noise transients. Some attempts have been made to minimize this problem by requiring several consecutive samples to indicate a speech signal prior to initiation of transmission; however, this method is effective only in eliminating fast impulse transients and causes a loss of the initial portion of many speech sounds. In addition, digital systems are still faced with a problem of establishing a noise threshold level consonant with efficient operation of the system. If the threshold or trigger level is set too low, fluctuations in the system noise level may cause the voice operated switch to trigger when the noise level increases. On the other hand, if the threshold or trigger level is set too high, the switch may fail to be triggered on the initial syllables of many sounds simply because these initial syllables tend to be very soft with slow rise times.

A further disadvantage of prior art voice operated switches is their tendency to dropout on very soft trailing edge syllables again resulting in clipped speech. Attempts to prevent this effect by providing a delay after a failure to detect voice activity, commonly referred to as "hangover time", have produced other problems, notably inefficiency in that the system "on" time is considerably increased. And by utilizing hangover to prevent trailing edge loss, the system becomes something less than syllabic and loses efficiency.

SUMMARY OF THE INVENTION:

This invention provides an all digital voice operated switch utilizing a variable threshold trigger level which automatically adjusts for variations in system noise levels and which provides a means for assuring that even the softest tones occurring at the beginning of a syllable are transmitted. Additionally, the present invention operates to switch the transmitter at a syllabic rate to greatly increase system efficiency yet assures that no transients are introduced into the transmitted data as a result of such rapid switching.

The above advantage is accomplished by sampling digital output signals from an analog to digital encoder and selecting from a predetermined number of samples the largest digital sample within that number. The signals may represent data to be transmitted or may be a separate signal representative of the data. This first selected sample is then stored in an accumulator while the process is repeated to select a second sample. The second sample is then clocked into the accumulator and added to the first sample. This process is repeated until a predetermined number of samples have accumulated. Obviously the accumulation is basically a summing or integration process which results in a digital number representing an integration of the largest activity detected by the encoder during a given time period. If voice signals occurred during the time period, the integration will result in a relatively large number; however, if no voice signals were present during the time period, the integration will result in a relatively small number and will be indicative of background noise. Consequently, if at the end of each time period, the integrated count is compared with an integrated count accumulated during a preceding time period and the smallest of the integrated counts placed in a storage register, the register will contain an integrated count representative of minimum background noise activity. A continuous process of this nature would result in eventually placing in the storage register a count very near to zero. To avoid this pitfall, at periodic intervals the integrated count from the accumulator, regardless of its size, is transferred into the storage register to establish a new basis. This method therefore results in establishing an automatically variable background noise threshold level. If desired, a fixed minimum noise level may be added to the variable level to establish a slightly higher trigger level.

To enable the voice operated switch, the integrated count from the accumulator is compared at the end of each time period with the established noise threshold level and a transmit signal is produced if the integrated count is greater than the threshold level. In order to preclude loss of voice signals, such as the soft tones at the beginning of syllables, while the integrated count is being established, the digital output signals from the encoder are directed through a delay circuit. Upon receipt of the transmit signal the modulator and transmitter are enabled while simultaneously a preamble or digital code word is directed into the modulator for transmission. The preamble provides data to allow the modulator to settle prior to receipt of coded voice signals and also provides a code which may be recognized by a receiver to allow the receiver to be turned on before receipt of the coded voice signals. The transients normally occurring because of cycling of the transmitter are prevented from being processed by the decoding equipment at the receiver by requiring that the voice operated switch at the receiver detect and recognize at least some portion of the transmitted preamble before turning on the receiver.

A further advantage of the present invention is that dropout is prevented until at least three successive integrated samples indicate that the encoder activity is less than the established threshold level. This assures that the very soft voice signals occurring at the trailing edge of many syllables will not be lost due to transmitter dropout. An additional time delay is provided to allow all data to pass through the delay circuit after dropout is indicated by three successive integrated samples; however, a high clock rate and a minimum delay are used to assure operation of the system at a syllabic rate.

Figure 1:
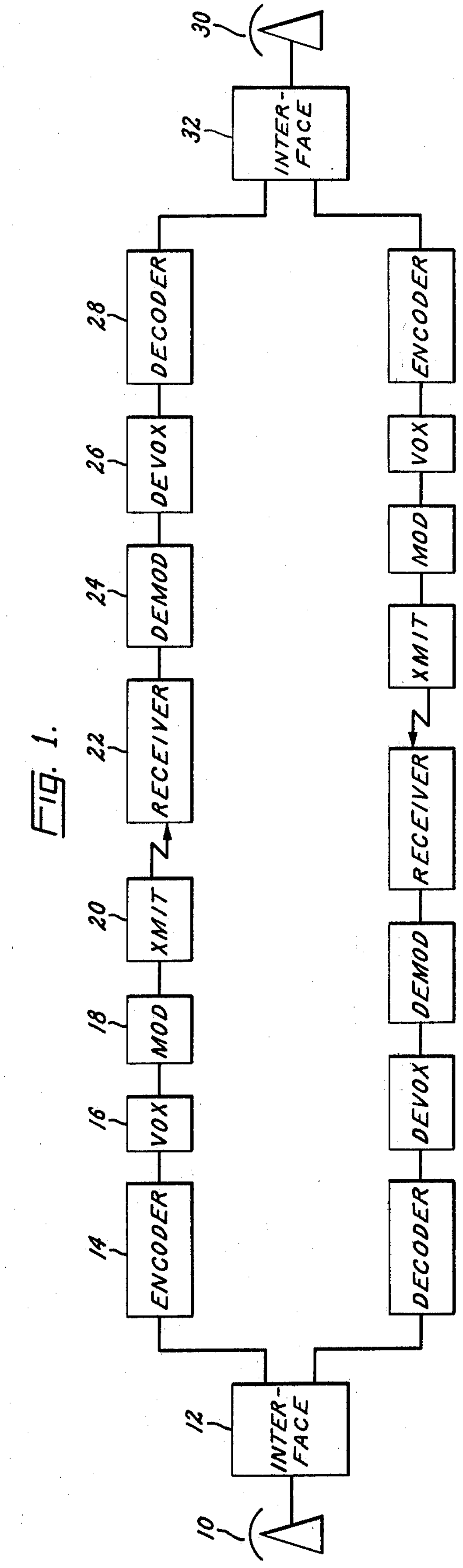
FIG. 1 represents a block diagram of a digital communication system utilizing a voice operated switching arrangement of the present invention.

DESCRIPTION OF THE PREFERRED EMBODIMENT:

Referring now to the drawings, FIG. 1 is a simplified block diagram of a typical communication transmission system in which analog data is converted into digital form for transmission as a digital signal. As can be seen from the drawing, each half of the system comprises individual transmit and receive apparatus and the apparatus in each half of the system may be identical to the apparatus in the second half of the system. Although the interconnections between the individual blocks of FIG. 1 are shown as only single lines, it is to be understood that each of the single lines may represent a plurality of electrical interconnection lines. An analog communication signal from subscriber 10 is connected via interface block 12 to an input of encoder 14. Encoder 14 converts the analog signal from interface block 12 into a digital signal. The digital signal is then directed into voice-operated switch (VOX) 16. The voice-operated switch 16 detects the incoming digital signal and enables operation of a modulator 18 while simultaneously sending out a pattern of bits to enable the modulator to stabilize and begin transmitting prior to receipt of the digital data from the encoder. In order to allow the modulator to stabilize before receiving the digital data, a clocked delay means is provided in voice-operated switch 16 to delay the output of the encoder for a predetermined time period. The output of the modulator is then sent to a transmitter 20 which transmits the digital data to a receiver 22.

Upon detection of an incoming signal by receiver 22, a signal is sent to demodulator 24 to turn it on and allow it to begin processing the received data through voice-operated switch (DEVOX) 26. During the time period that the digital data from encoder 14 was being delayed, voice-operated switch 16 was sending out a preamble through modulator 18 and transmitter 20. The preamble comprises a pattern of bits which can be recognized by the voice-operated switch 26 at the receiving end. Upon recognition of this particular preamble, voice-operated switch 26 turns on decoder 28 in the receiver thereby allowing it to convert the digital signal received from the transmitting station back into an analog signal for connection to subscriber 30 through interface block 32.

Figure 2:
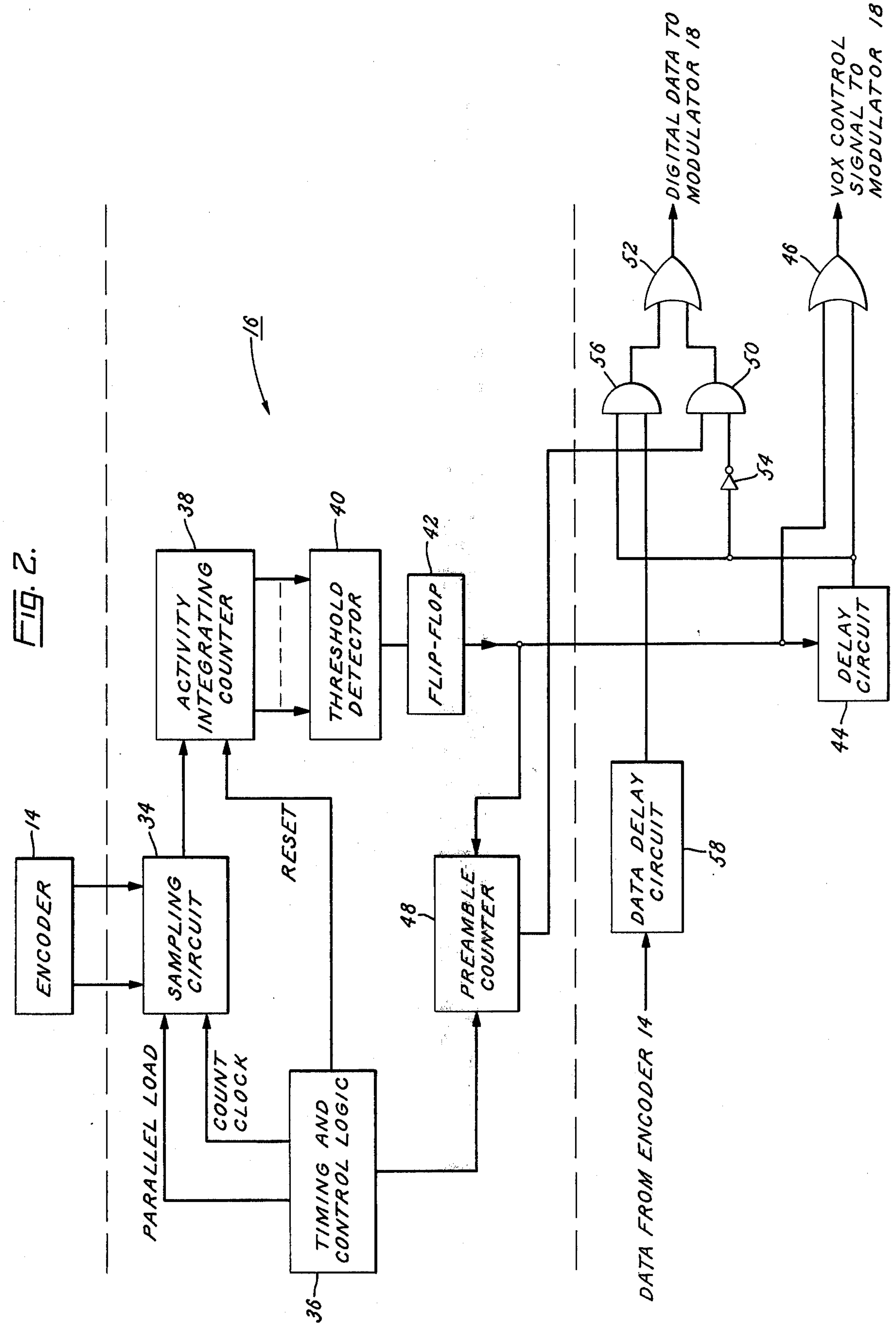
FIG. 2 is a simplified block diagram of the voice operated switch of the present invention used in a transmitter.

Referring now to FIG. 2, there is shown a simplified block diagram of one form of the voice-operated switch (VOX) shown at 16 in FIG. 1. VOX 16 comprises a sampling circuit 34 connected to receive an activity count in the form of a parallel digital word from encoder 14 indicative of the present amplitude of the analog input signal to encoder 14 which, in the case of a delta modulation transmission system, may be a companding word utilized in the encoder to define an incremental step size. Alternatively, sampling circuit 34 may be connected to monitor the digital data output of the encoder, in which case the sampling circuits need only respond to a circuit of data bits such as, for example, a sequence of logic 1's or logic 0's. In this embodiment, sampling circuit 34 may comprise and up/down counter and logic circuit wherein the logic circuit is connected to receive data from the encoder and to provide a count up or count down signal to the up/down counter in response to a sequence of logic 1's or logic 0's, respectively. In this embodiment the up/down counter essentially is used in place of the incremental step size adjusting means in encoder 14. The output from the up/down counter becomes the output of sampling circuit 34. This embodiment of the invention is therefore compatible with an analog to digital encoder which does not utilize companding techniques. For a better understanding of encoder in a delta modulation system, reference may be had to the copending application of Hoeschele et al., Ser. No. 379,435, filed July 16, 1973 and assigned to the assignee of the present invention.

Timing and control logic 36 provide timing signals to sampling circuit 34 to determine at which time interval the companding word from the encoder will be sampled and also determines when the contents of sampling circuit 34 will be transferred to the activity integrating counter 38. In order to coordinate operation of VOX 16 with encoder 14, control logic 36 is supplied with clock pulses from encoder 14. Counter 38 integrates or totals the count from sampling circuit 34 over a predetermined number of time intervals and then upon receipt of a transfer signal from timing and control logic 36 transfers the intergrated count into a threshold detector 40. In detector 40 the output of counter 38 is compared with a threshold level and a signal is sent to flip-flop 42 when the output of counter 38 exceeds the threshold level in detector 40. Upon receipt of a signal from detector 40 indicating that the integrated activity count is greater than the threshold level and thus that data is being sent through the encoder 14, flip-flop 42 sends a signal to delay circuit 44 and also sends a signal to OR gate 46. The output of OR gate 46 is a control signal to modulator 18 to enable it in preparation for transmission of data. Delay circuit 44 is a counter and associated control logic which provides an output signal a predetermined time period after receipt of the signal from flip-flop 42. A preamble counter 48 is also triggered by the output signal from flip-flop 42 and begins transmitting a predetermined pattern of data bits through AND gate 50 and OR gate 52 to modulator 18.

In addition to the companding word, VOX 16 is also connected to receive the digital data output from encoder 14. The data is passed through a delay circuit 58 to prevent loss of data at initial turn-on and while the preamble is transmitted. At the end of the predetermined time period, delay circuit 44 sends out an output signal through inverter 54 to disable AND gate 50 thus blocking the preamble code from counter 48 and enabling AND gate 56 to allow passage of the output data from encoder 14 which is now being received as an output of data delay circuit 58. The data is then passed through AND gate 56 and OR gate 52 to the modulator 18.

Figure 3:
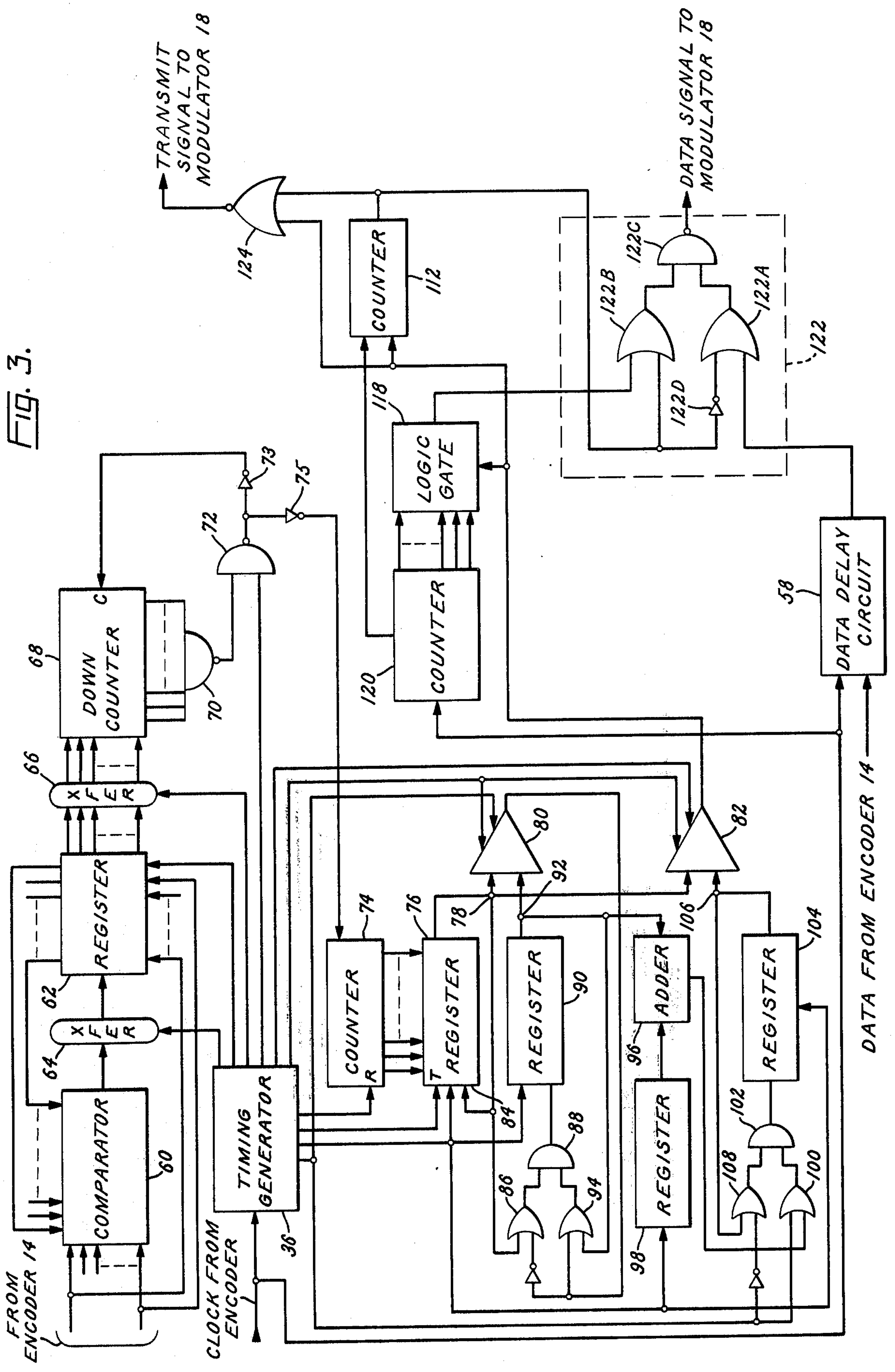
FIG. 3 is a more detailed block diagram of the voice operated switch of FIG. 2.

Referring now to FIG. 3 there is shown a more detailed block diagram of the voice-operated switch 16 shown in FIG. 2, for a system in which the activity in the encoder is determined by monitoring a companding word defining the incremental step size being used in the encoder. Sampling circuit 34 comprises a comparator 60, a transfer gate 64, a parallel input/parallel output storage register 62, a transfer gate 66, a down counter 68, and a NAND gate 70. Comparator 60 is connected to receive a digital word from encoder 14 on a first set of input terminals and connected to receive a second digital word from a register 62 on a second set of input terminals. Comparator 60 provides an output signal of first logical significance when the digital word received on the first set of input terminals is of greater amplitude than the digital word received on the second set of input terminals and provides a signal of second logical significance when the digital word on the first set of input terminals is smaller than the digital word received on the second set of input terminals. The output of comparator 60 is directed into transfer gate 64 which may comprise, for exmaple, an AND gate having a first input terminal connected to receive the output signal from comparator 60 and a second input terminal connected to receive a clock signal from timing generator 36 such that the output of transfer gate 64 can be timed to occur on a particular clock signal. The output of transfer gate 64 is directed into the parallel input/-parallel output storage register 62. Register 62 is also connected to receive the companding word from encoder 14 which is used as an input to comparator 60. The contents of register 62 are connected to be fed back in parallel arrangement to the second set of input terminals of comparator 60 for comparison with the input to comparator 60 from encoder 14. If the input from encoder 14 is larger than the contents of register 62, comparator 60 generates an output signal of first logical significance which output signal is detected by transfer gate 64. Upon receipt of a clock signal from generator 36, transfer gate 64 produces an enable signal causing transfer of the input from encoder 14 into register 62 so that the largest input word detected during a predetermined time period is always stored in register 62.

At the end of each predetermined time period during which period a predetermined number of comparisons have been made, the contents of register 62 are transferred through transfer gate 66 into down counter 68. The transferred word represents the largest digital word detected during the immediately preceding predetermined time period. Transfer is effected by a transfer pulse from generator 36 to transfer gate 66. Immediately after transfer occurs, generator 36 supplies a RESET pulse to register 62 and the comparison process described above is repeated. Transfer gate 66 may comprise, for example, a plurality of AND gates in which each AND gate has one input terminal connected to receive one of the output signals from register 62 and a second input terminal connected to receive the transfer pulse at a predetermined clock time. Upon receipt of the transfer pulse by gate 66, the contents of register 62 are transferred into down counter 68. Down counter 68 is of a type well-known in the art having a plurality of output terminals enabling one to read the digital content of the counter. The output terminals of counter 68 are connected to the input terminals of NAND gate 70. The output of NAND gate 70 is connected to one of the input terminals of NAND gate 72. A second input terminal of NAND gate 72 is connected to receive a continuous series of clock pulses from timing generator 36.

In order to count out the contents of counter 68, an output terminal of NAND gate 72 is connected in a feedback loop through an inverter 73 to the clock terminals of counter 68. Thus each clock pulse passed through NAND gate 72 reduces the count in counter 68 by one until a number of clock pulses equal to the count stored in counter 68 have been passed through NAND gate 72. The clock pulses, in addition to going to counter 68, are directed via a second inverter 75 into an integrating counter 74 where the clock pulses are accumulated for a plurality of time periods. Although referred to as an integrating counter, counter 74 is merely a digital counter of a type well-known in the art having a single input terminal for receiving clock pulses and a plurality of parallel output terminals for reading out the contents of the counter. In order to read out the accumulated count the output terminals of counter 74 are connected to corresponding ones of the input terminals of register 76. Register 76 may comprise, for example, a parallel-to-serial digital shift register having capability for recirculating data through external connections. Register 76 is capable of being clocked to provide in serial form the accumulated count, hereinafter referred to as a parallel digital word, last transferred into the register from counter 74. Output terminal 78 of register 76 is connected to a first input terminal of comparator 80, to a first input terminal of comparator 82 and to terminal 84 at the Most Significant Bit (MSB) end of register 76. The connection from terminal 78 to terminal 84 of register 76 provides recirculation of the data in register 76 so that the data is not lost when it is read out for use in comparators 80 and 82.

To provide for transfer of the digital word in register 76 to register 90, terminal 78 is also connected to a steering logic circuit comprising OR gates 86 and 94 and an AND gate 88. More specifically, terminal 78 is connected to a first input terminal of OR gate 86. The output of OR gate 86 is connected to a first input terminal of AND gate 88 and the output of AND gate 88 is connected into an input terminal of register 90. Register 90 may be, for example, a digital shift register of a type well-known in the art capable of receiving a logic signal on a first input terminal and sequentially clocking the logic signal through each of a plurality of stages and subsequently providing the logic signal at an output terminal delayed by a number of clock pulses equal to the number of stages in the register.

In order to compare the contents of register 90 to the contents of register 76 so as to select the smaller digital word, an output terminal 92 of register 90 is connected to a second input terminal of comparator 80. To provide data recirculation, terminal 92 is also connected to a first input terminal of OR gate 94 and the output terminal of OR gate 94 is connected to a second input terminal of AND gate 88. An output signal from comparator 80 controls the steering logic circuit represented by OR gates 86 and 94 and AND gate 88.

Comparator 80 and comparator 82 are both connected to receive a plurality of clock signals to coordinate the comparison of the digital data and to provide output signals from the comparators at appropriate clock times. The output of comparator 80 is connected to a second input terminal of OR gate 94 and through an inverter to a second input terminal of OR gate 86. As can be seen, the output signal from comparator 80 controls whether the input signals to register 90 will be through OR gate 94 as recirculated data or through OR gate 86 as a new input signal from register 76. The output of register 90 is also connected into a first input terminal of adder 96. A second input terminal of adder 96 is connected to receive a digital logic signal from register 98. Register 98 may be provided with means for manually storing a fixed digital number in a manner well-known in the art. The contents of register 98 are summed in adder 96 with the contents of register 90 on a bit-by-bit basis. The output of adder 96 is connected to a first input terminal of a steering logic circuit represented by OR gates 100 and 108 and AND gate 102. More specifically, the output of adder 96 is connected to a first input terminal of OR gate 100. The output of OR gate 100 is connected to a first input terminal of AND gate 102 and the output of AND gate 102 is connected to an input terminal of register 104 to thereby allow the summed output from adder 96 to be stored in register 104. Register 104 is identical to register 90. The output terminal 106 of register 104 is connected to a first input terminal of OR gate 108 and to a second input terminal of comparator 82. The output of OR gate 108 is connected to a second input terminal of AND gate 102 to permit recirculation of data stored in register 104. Second input terminals of OR gates 100 and 108 are connected to receive an update signal at predetermined clock times in order to provide an update of register 104 by transferring the summed output from adder 96 into register 104. Comparator 82 provides an output signal of first logical significance, hereinafter referred to as a transmit signal, if the contents of register 76 are larger than the contents of register 104.

The transmit signal from comparator 82 enables modulator 18 in preparation for transmission of data by providing an enable signal to OR gate 124, the output of OR gate 124 being connected to provide a transmit signal to modulator 18. Simultaneously the transmit signal from comparator 82 enables logic gate 118 to provide a coded preamble which is transmitted prior to transmission of data. The preamble is used to stabilize the modulator and transmitter and also provides a recognition code for the receiver to prevent receiver turn-on if spurious signals are received. To provide the preamble, logic gate 118 has a second plurality of input terminals connected to receive output signals from counter 120. Counter 120 is a continuously running counter clocked from a source of clock pulses (not shown). Logic gate 118 is of a type well-known in the art for producing a particular pattern of output logic signals which, for purposes of example, may be alternate 1-0 combinations.

A steering logic circuit 122 is provided to control whether the coded preamble or data is to be supplied to modulator 18. Logic circuit 122 is connected to receive the preamble from logic gate 118 on a first input terminal and data from encoder 14 on a second input terminal. A third input terminal of logic circuit 122 is connected to receive a control signal from counter 112. Counter 112 is connected to receive a signal from the output of comparator 82 on a first input terminal and clock signals from counter 120 on a second input terminal. Counter 112 provides a delay before supplying the transmit signal to steering logic circuit 122 to thereby allow a predetermined number of data bits of the coded preamble to be transmitted prior to transmission of data from encoder 14. In order to assure that no data bits are lost while the coded preamble is transmitted and further to assure that data bits are not lost due to inherent delays in circuit activation or failure to detect very soft initial word syllables, a delay circuit 58 is inserted between the output of encoder 14 and the data input terminal of logic circuit 122. Delay circuit 58 which may, for example, be a digital shift register of a type well-known in the art, is selected to provide a delay greater than the delay provided by counter 112 for transmitting the coded preamble. This excess delay provides a preattack time, i.e., the encoder begins supplying a data signal to modulator 18 prior to time that detected data has passed through delay circuit 58.

Steering logic circuit 122 may comprise a first OR gate 122A, a second OR gate 122B, and AND gate 122C, and an inverter 122D. As is shown in FIG. 3, the control signal from counter 112 is directed into a first input terminal of OR gate 122B and through inverter 122D into a first input terminal of OR gate 122A. The coded preamble is directed into a second input terminal of OR gate 122B and the data output from delay circuit 58 is directed into a second input terminal of OR gate 122A. The output signals from OR gates 122A and 122B are combined in AND gate 122C and the output from AND gate 122C constitutes the signal to be supplied to modulator 18 for transmission. With no transmit signal present, the output of counter 112 is a logic 0 thereby inhibiting OR gate 122A and enabling OR gate 122B; however, logic gate 118 is not enabled so no signals are supplied to OR gate 122B. Upon receipt of a transmit signal from comparator 82, logic gate 118 is enabled and the coded preamble is passed through OR gate 122B to AND gate 122C and thus to modulator 18. Shortly after receipt of the transmit signal, counter 112 times out and its output signal switches from a logic 0 to a logic 1 thereby inhibiting OR gate 122B and enabling OR gate 122A. The coded preamble is therefore blocked and data from delay circuit 58 is passed through OR gate 122A and AND gate 122C to modulator 18.

Since data is delayed by delay circuit 58, the transmit signal from comparator 82 will drop out before all the data from encoder 14 is passed through delay circuit 58. Consequently, it is necessary to delay turn-off of modulator 18 until all data is transmitted. This turn off delay is provided by counter 112, i.e., the output signal from counter 112 does not revert to a logic 0 until a fixed delay time after the transmit signal drops out. As is shown in FIG. 3, in order to hold modulator 18 enabled the output of counter 112 is directed into a second input terminal of OR gate 124 so that the output from OR gate 124 remains at a logic 1 for a fixed time period after the transmit signal drops out.

OPERATION OF FIG. 3

Although it will be apparent from the following discussion of the voice-operated switch shown in FIG. 3 that the timing of the various functions is strictly a matter of design choice, for purposes of clarity a particular set of values will be assumed. Comparator 60 continuously monitors the digital word from encoder 14 which, although preferably a companding word, may be any digital word representative of encoder activity and thus indicative of the presence of communication signals. Because the clock pulses utilized in the voice-operated switch 16 are also utilized in the encoder, the operation of the comparator is coordinated with the changing of the output word from encoder 14. Assuming that upon initial turn-on the contents of register 62 are a digital zero, upon receipt of the first word from encoder 14 greater than zero, the output signal of comparator 60 will assume a first logical significance, hereinafter referred to as a logic 1, and will provide the logic 1 signal to transfer gate 64. On the first clock pulse after receipt of the logic 1 from comparator 60, the output of transfer gate 64 will go to a logic 1 and this logic 1 will be detected by register 62 and will affect transfer of the digital output of the encoder into register 62. In this particular embodiment reset of register 62 is set to occur every 32 clock pulses; therefore the comparison process will continuously repeat for 32 clock times, that is, comparator 60 will repetitively monitor the encoder word and compare it with the contents of register 62 providing an output signal to transfer the encoder word into register 62 whenever the contents of register 62 are smaller than the encoder word then being received. Thus, at the end of 32 clock pulses register 62 will contain the largest encoder word received during the preceding 32 clock times. At the end of this 32 clock time period, a transfer pulse is sent to transfer gate 66 thereby transferring the contents of register 62 into down counter 68. A reset pulse delayed from the transfer pulse but prior to a succeeding clock pulse is then sent to register 62 which thereby resets register 62 to a zero condition in preparation for repeat of the above-described operation.

Assuming, as is the most probable case, that the contents of register 62 during a 32 clock pulse period were not at all times zero, down counter 68 will be set to some significant count. In the embodiment shown, the output signals from counter 68 are taken from the reset terminals of the various stages in the counter; consequently, when the counter counts down to zero the output signals will all go to logic 1's. With a count in the counter at least one of the output signals will be a logic 0, consequently, the output from NAND gate 70 will be a logic 1. The logic 1 output from NAND gate 70 connected to a first input of NAND gate 72 acts as a switch to turn NAND gate 72 on and allow the clock pulses on the second input of NAND gate 72 to be passed through the NAND gate where they are inverted and fed back to the clock inputs of down counter 68 to begin counting it down to a zero state. As can be seen, the number of clock pulses allowed to pass through NAND gate 72 will be equal to the count in counter 68 since once that number of count pulses have been passed through NAND gate 72 the counter 68 will be reset to a zero condition and all the inputs to NAND gate 70 will be logic 1's thereby providing a zero output from NAND gate 70 and shutting off NAND gate 72.

The count pulses from NAND gate 72 are accumulated in integrating counter 74. Counter 74 is controlled by reset pulse applied to terminal R of counter 74 which occurs, in the particular embodiment described, approximately every 25 ms. or, at a 40KHz. clock rate, every 1,024 counts. Counter 74 therefore accumulates 32 sets of counts received from down counter 68 through NAND gate 72. At the end of 25 ms. a transfer signal from timing generator 36, shown as an input to register 76, allows transfer of the accumulated contents of counter 74 into register 76. At this point in time register 76 now holds a count representative of the integrated activity occurring in encoder 14 over the last 25 ms. time period. Immediately after the transfer of the contents of counter 74 into register 76, a reset signal to counter 74 resets counter 74 back to a zero state in preparation for a repetition of the above-described operation; that is, counter 74 begins again to integrate the count being detected in encoder 14 during a subsequent 25 ms. period.

On the first clock pulse after receipt of the transfer pulse, a "compare shift" series of clock pulses is directed into registers 76, 90, 98, and 104. The compare shift clock pulses cause the contents of each of the registers to be sequentially clocked in recirculating fashion through their respective output terminals, thereby allowing the contents of the registers to be compared in comparators 80 and 82 on a bit-by-bit basis.

Figure 5:
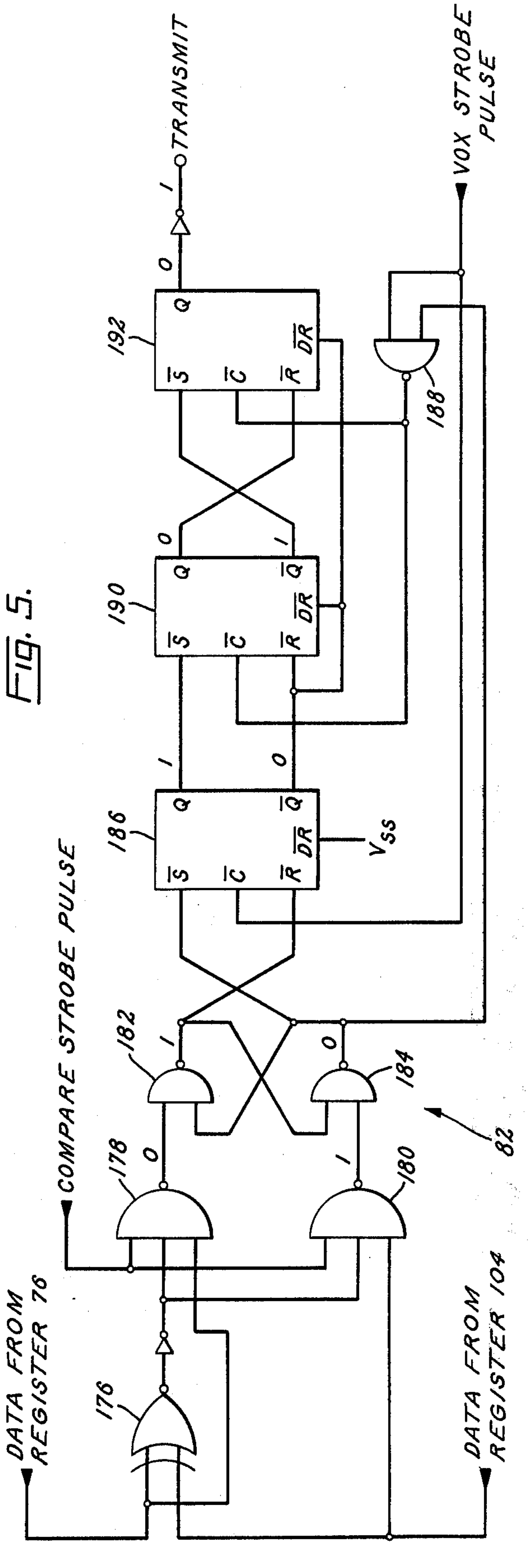
FIG. 5 is a detailed block diagram of a digital comparator used in the voice operated switch of FIG. 3.

The comparison process in comparator 80 is designed to produce a minimum threshold level; consequently, comparator 80 produces an output signal of first logical significance only when the contents of register 76 are smaller than the contents of register 90. Comparator 80 may be of a type well-known in the art which merely compares the outputs of register 76 and 90 on a bit-by-bit basis latching to a logic 1 output when the most significant bit from register 76 is smaller than the most significant bit in register 90. Such a comparator is shown in FIG. 5 to be described infra. In the situation described, however, where the registers were all in a reset condition it is necessary to insert some count in register 90 in order to be able to compare a present count with subsequent counts. Consequently, an arbitrary time period, such as for example, 6 seconds, may be selected to automatically transfer the contents of register 76 into register 90 while simultaneously transferring the contents of register 90 into register 104 through adder 96. In adder 96 the contents of register 90 are summed with the contents of register 98 and the resulting sum is stored in register 104. At the end of the transfer time, register 90 contains the number previously in register 76 while register 104 contains the sum of register 98 and the smallest number placed in register 90 during the preceeding 6 second period. The condition described above is therefore referred to as an update state. This transfer is effected by supplying a 6 second update signal to comparator 80 to force the output of comparator 80 to a first logical significance thereby allowing the contents of register 76 to be sequentially clocked into register 90 while at the same time supplying the same update signal to OR gates 100 and 108 to allow the output of adder 96 to be clocked into register 104.

Assuming that an update has occurred such that the contents of register 76, 90 and 104 are not zero, upon receipt of the compare shift clock signals the contents of registers 76 and 90 are compared in comparator 80 and a logic 1 is produced if the contents of register 76 are smaller than the contents of register 90. The logic 1 signal from comparator 80 allows the contents of register 76 to be transferred into register 90.

Figure 4:
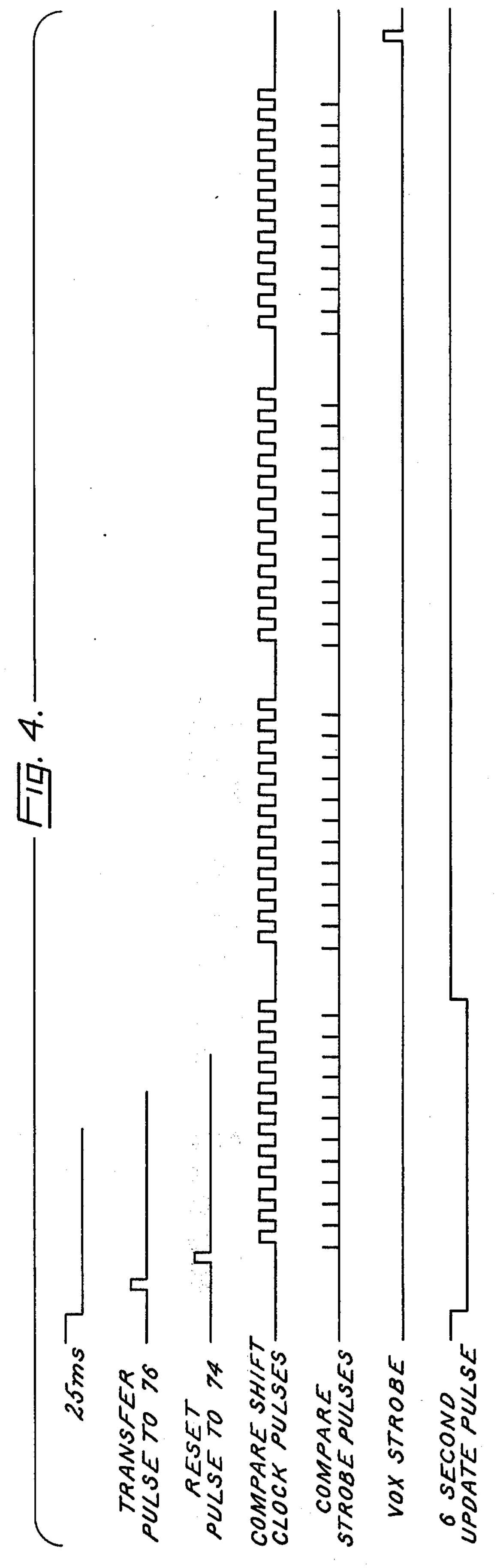
FIG. 4 is a simplified diagram of clocking signals utilized to effect control of the voice operated switch of FIG. 3.

For a better understanding of the timing relationship discussed above, reference may be had to FIG. 4 in which the clock signals presently being discussed are shown in time relationship. As can be seen from FIG. 4, the compare shift clock pulses are generated in timing generator 36 in four groups of 12 since in the embodiment being described the registers 76, 90 and 104 were designed to have 12 stages. Of course the number of stages in each register is merely a design choice. As will be appreciated two groups of compare shift clock pulses are required in order to transfer the contents of register 76 into register 104. The remaining two groups are utilized to effect the comparison process prior to transfer.

Referring again to FIG. 3 it will be seen that register 90 is forced to store a signal representative of an integrated count of the activity occurring over a 25 ms. period wherein that count represents the smallest average 25 ms. activity period. This process thereby assures that during every 6 second update period a threshold level equal to at least the mimimum signal detected during one of the 25 ms. periods will be available in register 90. Assuming that transmission of voice signals is occurring, it will be obvious to those skilled in the art that at least one of those periods will be representative of a time interval when no voice signals are being transmitted and thus will represent actual noise in the transmission system.

The contents of register 98 are selected as a function of the particular type of transmission system involved and may be manually or automatically set in as a delta level, i.e., the threshold circuitry identifies the background noise level and a small value is preferably added to that level to establish a threshold level. As can be seen in FIG. 3, the contents of register 104 are periodically updated by transferring into register 104 the sum of the contents of register 90 and register 98 such that register 104 therefore contains a variable threshold noise level. Comparator 82 compares the threshold noise level in register 104 with the present activity count stored in register 76 at the same periodic rate as comparison of the contents of register 76 and register 90 was performed. At the end of every comparison, i.e., at the end of every four groups of compare shift pulses, a VOX strobe pulse is supplied to comparator 82 to thereby read out the results of the comparison of the contents of register 76 and register 104. If the contents of register 76 are greater than the contents of register 104 thus indicating that the present activity is greater than the threshold noise level, a signal of first logical significance, referred to previously as a transmit signal, is generated.

The transmit signal is directed into OR gate 124 and into counter 112. Since the transmit signal has been selected to be a logic 1, the output of OR gate 124 immediately goes to a logic 1 thereby sending the transmit signal to modulator 18 to enable it in preparation for a receipt of data. Simultaneously, the transmit signal enables logic gate 118 so that a preamble, i.e., a predetermined pattern of data bits, is sent through OR gate 122B and AND gate 122C as a data signal to the modulator for transmission. Counter 120, clocked from the encoder clock, is continuously operating so that the preamble is available at logic gate 118 immediately upon receipt of the transmit signal. A fixed delay time, e.g., 10 ms., after receipt of the transmit signal, counter 112 produces a logic 1 output pulse which causes the output of OR gate 122B to go to a logic 1 thereby inhibiting the preamble and simultaneously enables OR gate 122A to allow the content of register 58 to be sent out through OR gate 122A and AND gate 122C. Delay circuit 58 provides a first predetermined data delay, e.g., 40 ms., and counter 112 provides an enable signal to open OR gate 122A a second predetermined time period which is less than the data delay time, e.g., 10 ms., after transmit is indicated. Consequently, a relatively long time interval in this example, 30 ms., is allowed to assure that no data being processed by encoder 14 will be lost by a failure of the threshold circuits to pick up when the signals to be transmitted are very soft syllabic sounds normally occurring at the beginning of many words.

Counter 112 maintains a logic 1 output for as long as the transmit signal is present and in addition holds the output at a logic 1 for 40 ms. after the transmit signal decays in order to assure that all the data from the encoder is transmitted.

As can be seen from the above-described operation, the apparatus provides a means of establishing a continuously variable threshold level as a function of transmission system noise or background noise and in addition provides circuitry to assure that even the softest syllables which occur at the beginning of spoken words are not lost because of failure of the system to react to the very soft sounds. In addition, comparator 82, which provides the transmit signal, is designed such that once the transmit signal is produced as an output, the output will not change until at least three consecutive comparisons have shown that noise is greater than present activity thus assuring that soft syllables occurring at the ends of words are also not lost by the system.

Referring now to FIG. 5 there is shown a more detailed block diagram of a comparator used to compare on a bit-by-bit basis the contents of two shift registers. The particular configuration shown in FIG. 5 is for comparator 82, although it will be apparent that with minor modifications this configuration can be used for any of the digital comparators utilized in this system. As can be seen the output of register 76 is connected to a first input terminal of exclusive NOR gate 176 and also to a first input terminal of NAND gate 178. A second input terminal of exclusive NOR gate 176 is connected to receive the digital data from register 104. The output of register 104 is also connected to a first input terminal of NAND gate 180. The output of exclusive NOR gate 176 is inverted and directed into both NAND gates 178 and 180. Each of the NAND gates 178 and 180 is also connected to receive a compare strobe pulse on respective input terminals. The compare strobe pulse is actually a series of pulses wherein a single pulse occurs just prior to each compare shift pulse. The output of NAND gate 178 is connected to a first input terminal of NAND gate 182 and the output of NAND gate 180 is connected to a first input terminal of NAND gate 184. NAND gates 182 and 184 comprise a NAND latch circuit of a type well-known in the art. The output of NAND gate 182 in addition to being fed back to a second input terminal of NAND gate 184 is connected to a reset terminal of flip-flop 186. Likewise, the output of NAND gate 184 in addition to being fed back to a second input terminal of NAND gate 182 is connected to a set terminal of flip-flop 186; however, the output of NAND gate 184 is also connected to a first input terminal of NAND gate 188. The Q and $\overline{Q}$ outputs of flip-flop 186 are connected respectively to the set ($\overline{S}$) and reset ($\overline{R}$) terminals of flip-flop 190. The $\overline{Q}$ output of flip-flop 186 is also connected to the direct reset ($\overline{DR}$) terminal of flip-flop 190 and flip-flip 192 to thereby force the Q output of flip-flop 192 to a logic 0 as soon as the $\overline{Q}$ output of 186 goes to a logic 0. The Q and $\overline{Q}$ outputs of flip-flop of 190 are connected respectively to the reset and set terminals of 192. Clock signals for flip-flops 186, 190 and 192 are supplied by a VOX strobe signal which occurs after completion of all four sets of compare shift pulses. As can be seen the VOX strobe signal is fed directly into flip-flop 186 but is directed into flip-flops 190 and 192 via NAND gate 188. The reason for supplying the VOX signals to flip-flops 190 and 192 through NAND gate 188 will become clear from the discussion of the operation of the circuitry described below.

OPERATION OF FIG. 5

In operation data from register 76 and 104 is sequentially clocked beginning with the least significant bit and progressing to the most significant bit such that each data bit is sequentially available at the input terminals of exclusive NOR gate 176. Just prior to the first compare shift pulse a compare strobe pulse is supplied to NAND gates 178 and 180. At this time the least significant bit from both registers is available at the input of exclusive NOR gate 176. If the least significant bit from register 76 is a logic 1 and the least significant bit from register 104 is a logic 0, the output of exclusive NOR gate 176 will be a logic 0. This logic 0 is inverted and directed into respective input terminals of NAND gate 178 and 180. Under the given conditions NAND gate 180 will have at least one input which is a logic 0 and therefore the output of NAND gate 180 will be a logic 1. Since two of the inputs of NAND gate 178 are logic 1's, upon receipt of a compare strobe pulse all three input terminals will receive a logic 1 and the output of NAND gate 178 will go to a logic 0. This logic 0 appears as an input to NAND gate 182 forcing the output of NAND gate 182 to go to a logic 1. The logic 1 output from NAND gate 182 is fed back as an input to NAND gate 184 so that both inputs to NAND gate 184 are now logic 1's thereby forcing the output of NAND gate 184 to go to a logic 0 and this logic 0 output is fed back to an input of NAND gate 182 thereby latching the output of NAND 182 to a logic 1. The outputs of NAND gates 182 and 184 will remain latched in their present status until the output signal from NAND gate 180 goes to a logic 0 and the output of NAND gate 178 goes to a logic 1. No change will occur in the latched state of NAND gates 182 and 184 for any other set of conditions of NAND gates 178 and 180. Exclusive NOR gate 176 assures that the data bits being monitored as output signals from registers 76 and 104 will not be effective to change the latched state of NAND gates 182 and 184 unless one of the bits is of different logical significance than the other bit. This means, of course, that even though the circuit begins monitoring the output of register 76 and register 104 from the least significant bit, the output of NAND gates 182 and 184 will be responsive only to the last bit from either of the monitored registers which is of greater logical significance than the bit in the same digital position in the other register.

Continuing with the above example wherein the output of NAND gate 182 is a logic 1, the input signals to flip-flop 186 are such that upon receipt of a clock pulse the Q and $\overline{Q}$ outputs will go to a logic 1 and a logic 0, respectively. The logic 0 from the $\overline{Q}$ output of flip-flop 186 is connected to the direct reset terminals of flip-flop 192 to a logic 0 to provide a transmit signal immediately after receipt of the VOX strobe clocking pulse if the data from register 76 is of greater significance than the data in register 104.

As the output of NAND gate 184 is also connected as an input to NAND gate 188, clock pulses which would normally be supplied to flip-flops 190 and 192 at the same time that flip-flop 186 is clocked are prevented from reaching the latter two flip-flops thereby assuring that the Q output of flip-flop 192 will remain in a logic 0 configuration and thus that the transmit signal will remain available.

Once the activity being monitored from register 76 becomes smaller than the minimum threshold level established in register 104, the outputs from NAND gates 182 and 184 will become reversed, that is, the output of NAND gate 182 will go to a logic 0 and the output of NAND gate 184 will go to a logic 1. Upon receipt of a VOX strobe clocking pulse the Q and $\overline{Q}$ outputs of flip-flop 186 will go to a logic 0 and a logic 1, respectively. This will remove the direct reset from flip-flops 190 and 192 and allow them to be clocked upon receipt of successive clock pulses. After a next set of comparisons, if the same situation exists, i.e., the present activity as determined by the contents of register 76 is still smaller than the minimum threshold level as determined by the contents of register 104, the clock pulse will cause the output of flip-flop 190 to cycle to the SET condition, i.e., the Q output will revert to a logic 1. Since the Q output of flip-flop 192 is utilized as a transmit signal, when the Q output goes to a logic 1 the transmit signal will be removed. As can be seen from the above-described operation, although the comparator operates to initiate a transmit command immediately upon finding that the contents of register 76 are greater than the contents of register 104, the dropout command, i.e., the removal of the transmit signal, does not occur until after three successive comparisons have indiated that the present activity is no longer greater than the minimum noise threshold level. This provision assures that the soft sounds normally occurring at the trailing edge of many syllables will not be lost due to the rapid switching of the above-described apparatus.

DESCRIPTION OF FIG. 6

Figure 6:
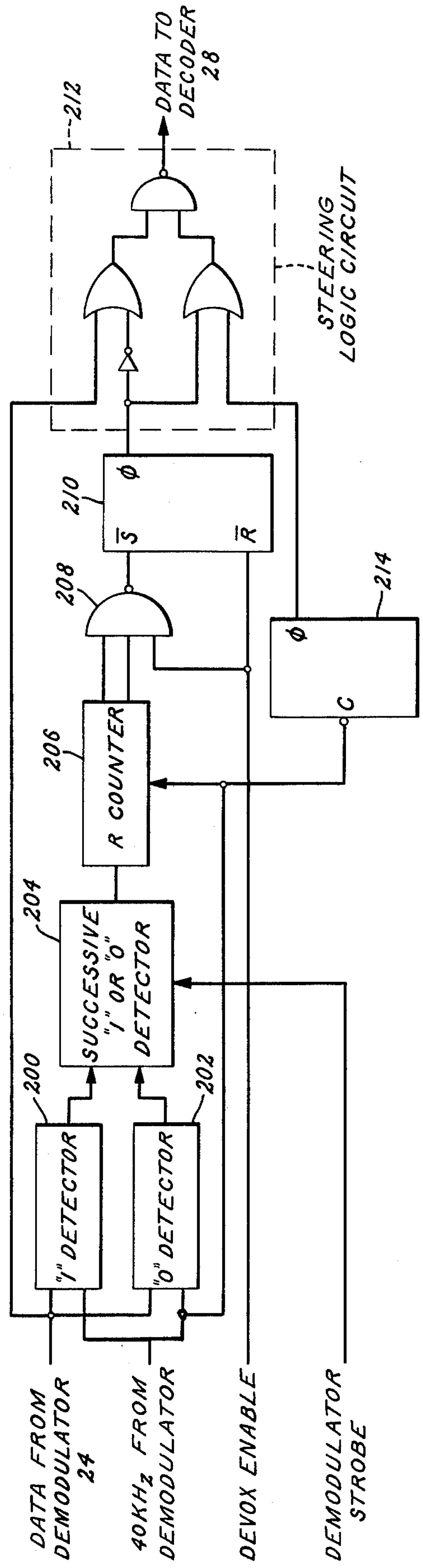
FIG. 6 is a block diagram of a voice operated switch of the present invention for use in a receiver.

Referring now to FIG. 6, there is shown a block diagram of the DEVOX 26 of FIG. 1. DEVOX 26 detects the incoming digital signals from the receiver and supplies the data to decoder 28 only if the incoming digital signals are determined to be actual data. DEVOX 26 comprises a pair of clocked logic detectors 200 and 202 connected to receive the incoming digital signals from demodulator 24. A clock signal, preferably taken from the demodulator 24 clock source (not shown), provides coordinated timing for detectors 200 and 202 and also for the other clocked elements of DEVOX 26. Detectors 200 and 202 are responsive respectively to logic "1" and logic "0" signals and supply output logic signals to successive logic detector 204. In the embodiment being described, a predetermined recognition code comprising a plurality of alternate 1 - 0 logic signals is utilized. If the correct recognition code is being received, the respective input terminals of detector 204 will receive a logic 1 on a first input terminal followed, at the next clock time, by a logic 0 on a second input terminal. So long as the respective first and second input terminals of detector 204 are receiving alternate 1-0 logic signals, the output of detector 204, which is connected to the direct reset (DR) terminal of counter 206, will remain a logic 1 and counter 206 will therefore count the number of alternate 1-0 logic signals received. When a predetermined number of alternate 1-0 logic signals have been received, the output signals from counter 206 are all logic 1's and are used to enable NAND gate 208; however, to preclude false enabling of NAND gate 208, a separate signal from receiver 22 is also used as an input to NAND gate 208. This latter signal, hereinafter referred to as DEVOX ENABLE, is produced by receiver 22 when incoming data is detected. Thus, in order to enable NAND gate 208, receiver 22 must be receiving data and the data must initially consist of a predetermined number of alternate 1-0 logic signals.

The output signal from NAND gate 208 is used to control flip-flop 210 which in turn is utilized to control steering logic circuit 212. Logic circuit 212 is identical to logic circuit 122 described above. As shown in FIG. 6, one input terminal of logic circuit 212 is connected to receive the incoming data signals from demodulator 24 and a second input terminal is connected to receive a signal from toggling flip-flop 214. The signal from flip-flop 214 will be a sequence of alternate 1-0 logic signals because flip-flop 214 is clocked by the system clock. Thus, the output signals from logic circuit 212 which are supplied to decoder 28 will be a sequence of alternate 1-0 logic signals until such time as any incoming data signals are preceded by a proper recognition code.

OPERATION OF FIG. 6

Assuming that receiver 22 is not detecting data signals, DEVOX ENABLE will be a logic 0 and will therefore force the output of NAND gate 208 to a logic 1. Flip-flop 210 will thus have a logic 1 on its SET terminal and a logic 0 on its RESET terminal and will yield a logic 0 output signal. The logic 0 output signal is directed into logic circuit 212 and causes logic circuit 212 to block the information received on the data input terminal while passing the alternate 1-0 signals received from flip-flop 214. Since the embodiment being described is for use in a delta modulation system, the alternate 1-0 logic signals prevent accumulation of erroneous information in decoder 28.

As an additional check, any incoming data is also monitored by detectors 200, 202 and 204. The output signal from detector 204 will be a logic 1 so long as alternate 1-0 logic signals are being detected; however, if two consecutive logic signals of the same logical significance are detected, the output of detector 204 will go to a logic 0 and reset counter 206 thereby preventing counter 206 from supplying enabling signals to NAND gate 208.

Upon receipt of data, DEVOX ENABLE will go to a logic 1 and counter 206 will begin counting the number of alternate 1-0 logic signals being detected. When the predetermined number of consecutive alternate 1-0 logic signals are detected, the output signal from counter 206 and DEVOX ENABLE will enable NAND gate 208 which will then cause flip-flop 210 to change state and supply a logic 1 signal to steering logic circuit 212. Logic circuit 212 will then begin passing the incoming data signals from demodulator 24 to decoder 28. As will be apparent to those skilled in the art, both DEVOX ENABLE and the output of NAND gate 208 must change state before flip-flop 210 switches and therefore even though alternate 1-0 logic signals are no longer being received when data begins coming in, DEVOX ENABLE will continue to hold flip-flop 210 in the proper state to allow data to be directed through logic circuit 212 to decoder 28.

Commercially available integrated circuit units provide shift registers, counters, OR gates, AND gates, and complemented gates referred to as NOR gates and NAND gates. For the purpose of description of the manner of operation of the invention, a combination of complemented and noncomplemented logic gates have been described; however, the manner of employing such devices to perform the logical operations included herein is part of the well-known art and the use of a particular logic device is not to be considered a limiting embodiment.

It is also part of the known art that the application of clock pulses to certain components may have to be delayed, particularly in high speed operation, to permit other components to change their state or condition. Since the delay required in any given case will be a function of the speed of operation of the components employed, it is not possible to specify these delays, the provision of which is part of the known art.

As certain changes may be made in the above constructions without departing from the spirit and scope of the invention, it is intended that all matter contained in the above description and shown in the accompanying drawings shall be interpreted as illustrative and not in a limiting sense.

What is claimed as new and desired to be secured by Letters Patent of the United States is:

1. Apparatus for establishing a variable threshold noise level, said apparatus comprising:

first means for selecting the largest data word from a first predetermined number of sequentially received data words;

second means connected to receive said largest data word and for accumulating a second predetermined number of said largest data words to form a summed data word;

third means connected to receive said summed data word and for selecting the smallest of said summed data words detected during a first predetermined time period; and fourth means connected to receive and store said smallest of said summed data words for use as a threshold noise level.

2. The apparatus as defined in claim 1 and including fifth means for adding to said smallest summed data word a fixed digital word to establish a threshold noise level.

3. The apparatus as defined in claim 1 wherein said first means comprises:

a comparator having a first and a second plurality of parallel input terminals and an output terminal, said comparator being connected to receive said data words on said first plurality of input terminals;

a storage register having a plurality of parallel input terminals and a corresponding plurality of output terminals, said register being connected to receive said data words on said plurality of input terminals, said output terminals being connected to corresponding ones of said second plurality of input terminals of said comparator for communicating data words from said storage register to said comparator; and wherein said comparator is effective to compare said data words on said first and second plurality of input terminals of said comparator and to produce an output signal when said data word on said first plurality of input terminals is larger than said data word on said second plurality of input terminals, said output signal causing said data word on said first plurality of input terminals to be loaded into said storage register.

4. The apparatus as defined in claim 1 wherein said second means comprises:

a down counter having a plurality of input terminals and a corresponding plurality of output terminals, said counter being connected to receive said largest data word on said plurality of input terminals and to supply said largest data word to said plurality of output terminals;

logic circuitry connected to receive said largest data word from said plurality of output terminals of said counter, said logic circuitry being effective to convert said largest data word to a serial data stream; and an integrating counter having an input terminal and a plurality of output terminals, said integrating counter being connected to receive said serial data stream on said input terminal and being effective to sum a plurality of said largest data words to form said summed data word.

5. The apparatus as defined in claim 1 wherein said third means comprises:

a first recirculating shift register having a plurality of input terminals for receiving said summed data word, said first register having an output terminal and serially providing said summed data word to said output terminal, said register having a further input terminal connected to said output terminal for recirculating said summed data word, a steering logic circuit having first, second and third input terminals and an output terminal, said first input terminal of said logic circuit being connected to said output terminal of said first register;

a second recirculating shift register having an input terminal and an output terminal, said output terminal of said second register being connected to said second input terminal of said logic circuit, said output terminal of said logic circuit being connected to said input terminal of said second register;

a comparator having first and second input terminals and an output terminal, said first input terminal of said comparator being connected to said output terminal of said first register and said second input terminal of said comparator being connected to said output terminal of said second register, said output terminal of said comparator being connected to said third input terminal of said logic circuit, said comparator producing an output signal of first logical significance when said summed data word in said first register is smaller and said summed data word in said second register and producing an output signal of second logical significance when said summed data word in said first register is larger than said summed data word in said second register; and wherein said logic circuit is responsive to said signal of first logical significance to transfer said summed data word from said first register into said second register and is responsive to said signal of second logical significance to cause said summed data word in said second register to be recirculated.

6. The apparatus as defined claim 1 wherein said fourth means comprises:

a shift register having an input terminal and an output terminal;

a steering logic circuit having an output terminal and first, second and third input terminals, said output terminal of said logic circuit being connected to said input terminal of said register, said first input terminal of said logic circuit being connected to said output terminal of said register and said second input terminal being connected to said third means to receive said summed data word from said third means; and means for supplying a periodic update signal to said third input terminal of said logic circuit to cause said summed data word to be transferred from said third means into said shift register.

7. The apparatus as defined in claim 2 wherein said fifth means comprises:

a storage register for storing a fixed data word;

an adder including a first input terminal connected to receive said smallest summed data word and a second input terminal connected to receive said fixed data word from said storage register, said adder being effective to add said smallest summed data word and said fixed data word to produce a data word representative of threshold noise level.

8. The apparatus as defined in claim 6 wherein said smallest summed data word placed in said second register during a second predetermined time period is automatically transferred into said shift register while said summed data word in said first register is simultaneously transferred into said second register to thereby effect an update of said apparatus.

9. A method of establishing a variable threshold noise level comprising the steps of:

selecting the largest data word from a first predetermined number of sequentially received data words;

accumulating a second predetermined number of said largest data words to form a summed data word;

repeating the preceding step over a first predetermined time period to provide a plurality of summed data words;

selecting the smallest of said summed data words received during said first predetermined time period; and storing said smallest of said summed data words for use as a threshold noise level.

10. The method as defined in claim 9 and including the step of:

adding to said smallest of said summed data words a fixed data word to produce a new word representative of threshold noise level.

11. The method as defined in claim 9 wherein said smallest of said summed data words is automatically transferred for storing and use as a threshold noise level at periodic second predetermined time periods.

12. Apparatus for detecting speech signals in the presence of noise comprising:

first means for selecting the largest data word from a first predetermined number of sequentially received data words;

second means connected to receive said largest data word and for accumulating a second predetermined number of said largest data words to form a summed data word; and third means for receiving said summed data word and for comparing said summed data word to a noise threshold level, said third means providing an output signal when said summed data word exceeds said threshold noise level.

13. The apparatus as defined in claim 12 wherein said first means comprises:

a digital comparator having a first and a second plurality of parallel input terminals and an output terminal, said comparator being connected to receive said data words on said first plurality of input terminals;

a storage register having a plurality of parallel input terminals and a corresponding plurality of output terminals said register being connected to receive said data words on said plurality of input terminals, said output terminals being connected to corresponding ones of said second plurality of input terminals of said comparator for communicating data words from said storage register to said comparator; and wherein said comparator is effective to compare said data words on said first and second plurality of input terminals of said comparator and to produce an output signal when said data word from said first plurality of input terminals is larger than said data word on said second plurality of input terminals, said output signal causing said data word on said first plurality of input terminals to be loaded into said storage register.

14. The apparatus as defined in claim 12 wherein said second means comprises:

a down counter having a plurality of input terminals and a corresponding plurality of output terminals, said counter being connected to receive said largest data word on said plurality of input terminals, and to supply said largest data word to said plurality of output terminals;

logic circuitry connected to receive said largest data word from said plurality of output terminals of said counter, said logic circuitry being effective to convert the largest data word to a serial data stream; and an integrating counter having an input terminal and a plurality of output terminals, said integrating counter being connected to receive said serial data stream on said input terminal and being effective to sum a plurality of said largest data words to form said summed data word.

15. The apparatus as defined in claim 12 wherein said third means comprises:

a first recirculating shift register having an output terminal and an input terminal connected to recirculate data and further including a plurality of input terminals connected to receive said summed data word; said register being responsive to a first signal to transfer said summed data word into said register, and being responsive to a second plurality of clock signals to serially clock said summed data word to said output terminal while recirculating said summed data word to said input terminal;

a comparator having a first input terminal connected to said output terminal of said register and a second input terminal connected to receive a digital word representative of a threshold noise level, said comparator being effective to compare said summed data word to said threshold noise level on a bit-by-bit basis and produce an output signal when said summed data word is larger than said threshold noise level.

16. A digital voice-operated switch for use in a delta modulation transmission system including an encoder providing a digital data stream and wherein said encoder further provides a digital word representative of encoder activity, said voice-operated switch comprising:

first means for selecting the largest data word from a first predetermined number of sequentially received data words;

second means connected to receive said largest data word and for accumulating a second predetermined number of said largest data words to form a summed data word;

third means for receiving said summed data word and for comparing said summed data word to a threshold noise level, said third means providing a first signal when said summed data word exceeds said threshold noise level; and fourth means responsive to said first signal to provide a transmit signal.

17. The digital voice-operated switch as defined in claim 16 and including:

fifth means responsive to said first signal to provide a second signal after a first predetermined time period and to maintain said second signal a second predetermined time period after removal of said first signal;

sixth means responsive to said first signal to provide a predetermined pattern data signals;

seventh means for delaying data from said encoder for a time period equal to said second predetermined time period;

eighth means having a first, a second, and third input terminal and an output terminal, said first input terminal being connected to receive said predetermined pattern of data signals, said second input terminal being connected to receive said delayed data, and said third input terminal being connected to receive said second signal, and wherein said eighth means is responsive to said second signal being of first logical significance to pass said predetermined pattern of data signals to said output terminal and being responsive to said second signal of second logical significance to block said predetermined pattern of data signals and to pass delayed data from said seventh means to said output terminal.

18. The digital voice-operated switch as defined in claim 16 wherein said first means comprises:

a digital comparator having a first and a second plurality of parallel input terminals and an output terminal, said comparator being connected to receive said data words on said first plurality of input terminals;

a storage register having a plurality of parallel input terminals and a corresponding plurality of output terminals, said register being connected to receive said data words on said plurality of input terminals, said output terminals being connected to corresponding ones of said second plurality of input terminals of said comparator for communicating data words from said storage register to said comparator; and wherein said comparator is effective to compare said data words on said first and second plurality of input terminals of said comparator and to produce an output signal when said data word from said first plurality of input terminals is larger than said data word on said second plurality of input terminals, said output signal causing said data word on said first plurality of input terminals to be loaded into said storage register.

19. The digital voice-operated switch as defined in claim 16 wherein said second means comprises:

a down counter having a plurality of input terminals and a corresponding plurality of output terminals, said counter being connected to receive said largest data word on said plurality of input terminals, and to supply said largest data word to said plurality of output terminals;

logic circuitry connected to receive said largest data word from said plurality of output terminals of said counter, said logic circuitry being effective to convert the largest data word to its serial data stream; and an integrating counter having an input terminal and a plurality of output terminals, said integrating counter being connected to receive said serial data stream on said input terminal and being effective to sum a plurality of said largest data words to form said summed data word.

20. The digital voice-operated switch as defined in claim 16 wherein said third means comprises:

a first recirculating shift register having an output terminal and an input terminal connected to recirculate data and further including a plurality of input terminals connected to receive said summed data word, said register being responsive to a first signal to transfer said summed data word into said register, and being responsive to the second plurality of clock signals to serially clock said summed data word to said output terminal while recirculating said summed data word to said input terminal; and a comparator having a first input terminal connected to said output terminal of said register and a second input terminal connected to receive a digital word representative of a noise threshold level, said comparator being effective to compare said summed data word to said threshold noise level on a bit-by-bit basis and produce an output signal when said summed data word is larger than said threshold noise level.

21. The digital voice-operated switch as defined in claim 16 wherein said fourth means comprises an OR gate having first and second input terminals and an output terminal, said first input terminal being connected to receive said first signal and said second input terminal being connected to receive said second signal and wherein said transmit signal is provided at said output terminal.

22. The digital voice-operated switch as defined in claim 17 wherein said fifth means comprises a digital counter.

23. The digital voice-operated switch as defined in claim 17 wherein said sixth means comprises a digital counter and a logic circuit connected to receive count pulses from said counter and responsive thereto to provide a predetermined pattern of data bits.

24. The digital voice-operated switch as defined in claim 17 wherein said seventh means comprises a digital shift register.

25. A digital voice-operated switch for use in a receive channel of a digital communication system of a type including a digital to analog decoder in said receive channel, said switch comprising:

first means connected to receive data signals and responsive to a first predetermined pattern thereof for enabling said receive channel to pass said data signals to said decoder; and second means for supplying a second predetermined pattern of digital signals to said decoder in the absence of said data signals.

26. In a delta modulation communication system including an encoder in a transmit channel for converting an analog signal to a digital data stream and a decoder in a receive channel for converting said digital data stream to an analog signal, the improvement comprising:

a digital voice-operated switch having a first section in said transmit channel and a second section is said receive channel, said first section being responsive to said digital data stream from said encoder to enable said transmit channel and to transmit a predetermined pattern of logic signals, said first section including means for delaying said digital data stream while transmitting said logic signals, and said second section being responsive to said logic signals to enable said receive channel.

27. The improvement as defined in claim 26 wherein said first section of said voice-operated switch comprises:

first means for selecting the largest data word from a first predetermined number of sequentially received data words;

second means connected to receive said largest data word and for accumulating a second predetermined number of said largest data words to form a summed data word;

third means for receiving said summed data word and for comparing said summed data word to a threshold noise level, said third means providing a first signal when said summed data word exceeds said threshold noise level; and fourth means responsive to said first signal to provide a transmit signal;

fifth means responsive to said first signal to provide a second signal after a first predetermined time period and to maintain said second signal a second predetermined time period after removal of said first signal;

sixth means responsive to said first signal to provide a predetermined pattern of data signals;

seventh means for delaying data from said encoder for a time period equal to said second predetermined time period;

eighth means having a first, a second, and a third input terminal and an output terminal, said first input terminal being connected to receive said predetermined pattern of data signals, said second input terminal being connected to receive said delayed data, and said third input terminal being connected to receive said second signal, and wherein said eighth means is responsive to said second signal being of first logical significance to pass said predetermined pattern of data signals to said output terminal and being responsive to said second signal of second logical significance to block said predetermined pattern of data signals and to pass delayed data from said seventh means to said output terminal.

28. The improvement as defined in claim 26 wherein said second section of said voice-operated switch comprises:

ninth means connected to receive said digital data stream and said logic signals, said ninth means being responsive to said logic signals to enable said receive channel to pass said digital data stream to said decoder; and tenth means for supplying a second predetermined pattern of logic signals to said decoder in the absence of said digital data stream.

* * * * *